(12) United States Patent
Ouji et al.

(10) Patent No.: US 10,127,683 B2
(45) Date of Patent: Nov. 13, 2018

(54) METHOD FOR DETERMINING THE SHORT AXIS IN A LESION REGION IN A THREE DIMENSIONAL MEDICAL IMAGE

(71) Applicant: Agfa HealthCare NV, Mortsel (BE)

(72) Inventors: Asma Ouji, Mortsel (BE); Yoni De Witte, Mortsel (BE)

(73) Assignee: AGFA HEALTHCARE NV, Mortsel (BE)

( * ) Notice: Subject to any disclaimer, the term of this patent is extended or adjusted under 35 U.S.C. 154(b) by 0 days.

(21) Appl. No.: 15/541,027

(22) PCT Filed: Dec. 16, 2015

(86) PCT No.: PCT/EP2015/079916
§ 371 (c)(1),
(2) Date: Jun. 30, 2017

(87) PCT Pub. No.: WO2016/110384
PCT Pub. Date: Jul. 14, 2016

(65) Prior Publication Data
US 2018/0005403 A1    Jan. 4, 2018

(30) Foreign Application Priority Data
Jan. 6, 2015 (EP) .................................... 15150133

(51) Int. Cl.
*G06T 7/62* (2017.01)
*G06T 7/00* (2017.01)

(52) U.S. Cl.
CPC .............. *G06T 7/62* (2017.01); *G06T 7/0012* (2013.01); *G06T 2207/10081* (2013.01); *G06T 2207/10088* (2013.01); *G06T 2207/20068* (2013.01); *G06T 2207/30096* (2013.01)

(58) Field of Classification Search
CPC . G06T 2207/20068; G06T 2207/30096; G06T 7/0012; G06T 7/62
See application file for complete search history.

(56) References Cited

U.S. PATENT DOCUMENTS

2009/0180677 A1    7/2009   Li et al.
2011/0243402 A1    10/2011  Kadir

OTHER PUBLICATIONS

Official Communication issued in International Patent Application No. PCT/EP2015/079916, dated Mar. 21, 2016.
Campadelli et al., "3D Volume Reconstruction and Biometric Analysis of Fetal Brain from MR Images", Computational Intelligence Methods for Bioinformatics and Biostatistics, ISBN: 978-3-642-02503-7, Oct. 3, 2008, 10 pages.

*Primary Examiner* — Siamak Harandi
(74) *Attorney, Agent, or Firm* — Keating and Bennett, LLP

(57) ABSTRACT

A short axis in a 3 dimensional image of a lesion is determined starting from voxels defining the long axis and voxels in the plane of the long axis. Voxels within the plane of the long axis are projected perpendicularly onto the long axis and receive an identifier indicative of the region on the long axis onto which they are projected. Distances between points (projected sub-voxels) in pairs of points within the same range and within adjacent ranges are evaluated in order to determine the longest distance.

3 Claims, 3 Drawing Sheets a)

b)

METHOD FOR DETERMINING THE SHORT AXIS IN A LESION REGION IN A THREE DIMENSIONAL MEDICAL IMAGE

CROSS-REFERENCE TO RELATED APPLICATIONS

This application is a 371 National Stage Application of PCT/EP2015/079916, filed Dec. 16, 2015. This application claims the benefit of priority to European Application No. 15150133.5, filed Jan. 6, 2015, which is incorporated by reference herein in its entirety.

BACKGROUND OF THE INVENTION

1. Field of the Invention

The present invention relates to a method of computing an axis along a predefined direction in a 3 dimensional medical image representation. The invention more specifically relates to a method of determining the short axis in a 3 dimensional image of a lesion, e.g. a tumor.

2. Description of the Related Art

Short and long axes are important measures to reflect the three dimensional size of lesions. These measures are used to evaluate and follow up a lesion in medical diagnosis and treatment.

These measures are used for example in the RECIST (Response Evaluation Criteria In Solid Tumors) standard to define how a tumor responds, stabilizes or progresses during treatment.

Processed nodules are extracted from 3D reconstructions of MRI (magnetic resonance imaging) or CT (X-ray computed tomography).

The short and long axes are defined in the same plane. The direction of this plane is predefined. It usually corresponds to the direction of the native slices (the DICOM images). The plane itself is computed while computing the long axis.

Given a pair of points (voxels) defining the long axis in a plane, also called maximum diameter corresponding to the maximum distance between any two points in the plane, the short axis is defined as the perpendicular longest axis to the long axis.

It corresponds to the maximum distance between any two points in the set that define a perpendicular axis to the long axis. Both axes are defined in the same plane which usually corresponds to the volume native planes (slices, DICOM images, example in FIG. 1).

A number of algorithms proposing a fast estimation of the long axis exist in the literature.

However there is still a demand for an accurate method for estimation of the short axis.

SUMMARY OF THE INVENTION

It is an aspect of the present invention to provide a fast and accurate method to compute the short axis of a set of voxels.

Further objects will become apparent from the description given below.

The above-mentioned aspects are realised by a computer-implemented method having the method steps set out below.

The method has been designed to operate on CT and MRI 3D reconstructions, but can be applied to any 2D image.

The invention relates to the computation of the short axis. The long axis can also be computed using a well-known method.

The method starts from a set of voxels defining a 3D lesion and the direction of the plane containing the axes (usually the native slice direction).

If the acquisition is a 2D image, the method starts from this image.

Input of the pair of voxels defining the long axis as well as its corresponding plane can be computed within the method of the present invention (as described below in the detailed description).

However, the long axis can also be determined in advance. Its definition can be stored in and retrieved from memory or can be determined in advance of the steps of the method for determining the short axis.

Specific features for preferred embodiments of the invention are set out below.

The present invention is generally implemented as a computer program product adapted to carry out the method of any of the claims when run on a computer and is stored on a computer readable medium.

Further advantages and embodiments of the present invention will become apparent from the following description and drawings.

DETAILED DESCRIPTION OF THE PREFERRED EMBODIMENTS

The short and the long axes computation requires the input of a set of voxels.

These voxels may correspond to all voxels contained in a lesion mask.

The lesion mask can be obtained by any lesion segmentation method, e.g. the one described in co-pending European patent application 13168875.6 entitled "Method of defining a region of interest", filed on May 23, 2013.

The position of the long axis, as well as the plane in which it is defined is required to compute the short axis according to the method of the present invention.

The long axis computation requires the input of a set of voxels defining the lesion and the direction of the plane containing the axes (usually the native slice direction)

Several methods exist to compute the long axis. Below an example of such a method is described.

Example of Long Axis Computation

For each plane orthogonal to the given direction, the distance between each pair of points is computed (in this exemplary embodiment, the distance from voxel center to voxel center is considered). The pair of points having the maximum distance defines the local diameter in its corresponding plane.

Among the local diameters defined for each plane, the maximum diameter is defined as the diameter with the largest of the above distances. This diameter, as well as the plane where it is found, are used as input for the short axis algorithm, e.g. as a set of voxels defining the plane on one hand and a pair of voxels defining the long axis in the other hand.

Figure 1:
FIG. 1 illustrates the short and long axes in native planes of a 3D volume representation.
Figure 2:
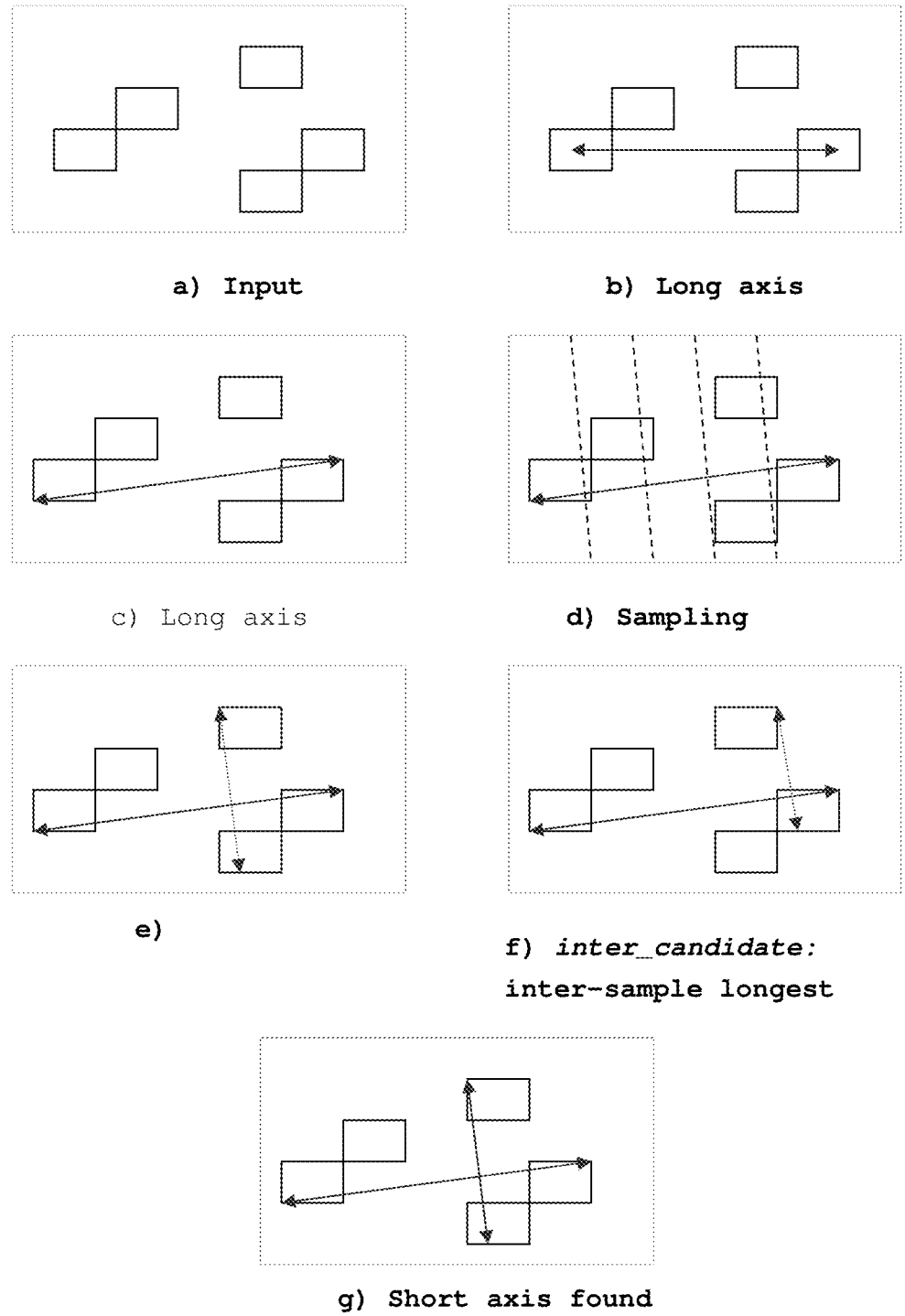
FIG. 2 illustrates the method of computation of the short axis according to the present invention applied to a 5 voxel mask.
Figure 3:
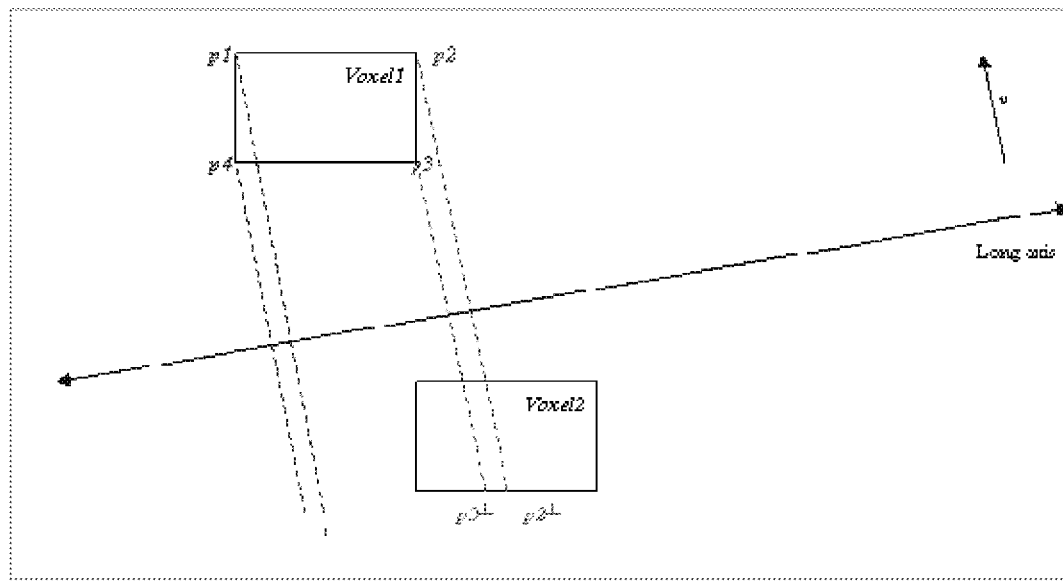
FIG. 3 illustrates a refinement of the short axis computation method of the present invention.
Figure 3:
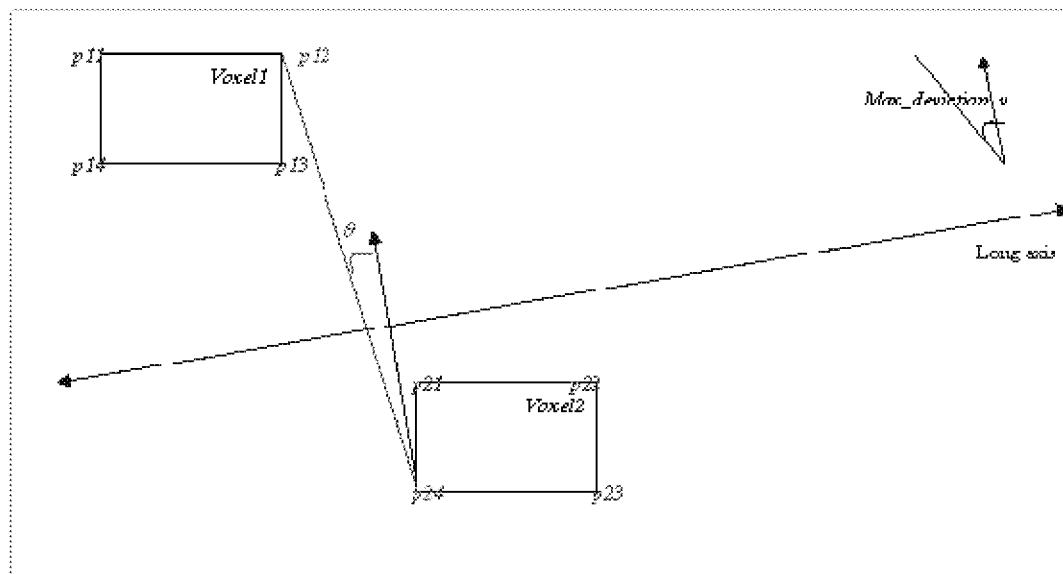

The above algorithm provides the maximum diameter defined using voxel centers (FIG. 2.*b*).

In a following step the centers can be replaced by corner values to get a more accurate diameter (FIG. 2.*c*). In the illustrated embodiment 'center' corresponds to the voxel parallelepiped geometrical center.

The algorithm can be run with the voxel centers instead of voxel corners as input in order to have less data to process.
Short Axis Computation According to the Invention:

Let u be a unit vector collinear to the long axis and v a unit vector perpendicular to u in the input plane.

Voxel_size is a 3D vector defining the voxel size (in mm). Max_deviation is a user defined parameter which is used to control the maximum deviation angle allowed from v direction. To get a short axis which makes an angle of exactly 90° with the long axis, this parameter should be set to 0°.

1. Define an initial range width called range_width such as:

range_width=Voxel_size·*u*

This formula provides the most optimal result for the next step of sampling/clustering, since it provides a range with the size of a projected voxel so only aligned voxels will be in the same range.

Alternative formulae may be used but might demand a larger number of iterations. Larger ranges may be envisaged if Max_deviation is large.

2. Sample the long axis.

The long axis is sampled by subdividing it into a set of equal size ranges. Each range width is range_width (FIG. 2.*d*). In the following, the words range, cluster and sample refer to the same reference.

3. Each point from the input set of voxels is projected along u and assigned to one of the ranges according to the position of its projection value (in FIG. 2.*d* each range member is assigned the same identifier). In this way clusters of voxels assigned to the same range are generated.

4. Within each cluster, find internally the most distant pair of points, if any. Let intra_candidate be the pair of points having the maximum distance among all clusters (in FIG. 2.*e*, intra_candidate points are highlighted). At this level in this embodiment, distances are computed between voxel centers.

Alternatively one of the voxel corners can be considered instead (must be the same corner), e.g. the distances can be computed between top left corner to top left corner.

5. Evaluate the pair intra_candidate. The evaluation algorithm is described in the following section. This algorithm determines whether the input pair is a valid candidate and, if valid, replaces the voxel centers by edge points.

A pair is considered a valid pair if inside the voxels of the pair an axis can be drawn that is substantially perpendicular to the long axis, "substantially perpendicular" in the context of this invention meaning that the deviation angle of the direction of this axis from the direction perpendicular to the long axis is smaller than a pre-defined value max_deviation.

The value of the deviation angle can be set by the user. It can be set to 0° to get accurate results. A few degrees more can be acceptable (e.g. 5° is a good compromise according to experiments).

6. For each range range_i, find the pair of points (if any) defining the maximum distance such that one point belongs to range_i and the other point belongs to an adjacent range to range_i. If a pair of points in found for range_i, it is added to a list of pairs called inter_candidantes. At this level, distances are also computed using voxel centers.

Alternatively one of the voxel corners can be considered instead (must be the same corner), e.g. the distances can be computed between top left corner to top left corner.

7. Sort the pairs in the list of inter_candidantes according to their distances, e.g. in descending order.

8. Run through the list inter_candidantes (starting from the one with longest distance. If a valid pair (the pair is evaluated by the evaluation and refinement algorithm defined below) is found during the run, the short diameter is assigned to either this pair or to a member of the list of intra_candidates if it exists, is valid and has a larger distance. If such a pair is found, the algorithm stops.
Else, the next pair in the list is evaluated.

9. If no valid pair (including intra_candidate) is found, and if the range width range_width is smaller than a given limit, increase range_width and go to step 2. This limit can be set the double value of the initial range width (which is computed in step 1) for example.
Evaluation and Refinement Algorithm The algorithm defined in this section works with the input of a pair of voxels. It evaluates a candidate pair, i.e. tells whether it is possible to find inside these voxels a perpendicular axis to the long axis with a deviation angle from the direction perpendicular to the direction of the long axis smaller than max_deviation. It also replaces the voxel centers by a pair of points within the voxel edges.

Let voxel1 be a first voxel of an input pair and voxel2 a second point of the input pair of voxels (voxel1 and voxel2 are commutable).

For each corner point $p_i$ (4 corners in total) in voxel1, if the collinear axis to v passing through pi intersects voxel2, then the input pair is valid and $pair_i$ is defined as the diameter composed of the points $p_i$ and the most distant intersection point with voxel2 (actually only the interaction with the 4 edges are considered). Otherwise (if all axes do not intersect voxel2), go to step 3.

Center point corresponds to the projected voxel (projected as it corresponds to the intersection between the voxel and the working plane) parallelogram geometrical center and the corner points to the parallelogram geometrical corners.

Return the pair $pair_i$ (i in {1, 2, 3, 4}) having the maximum distance as final refinement result. Stop the evaluation and refinement algorithm.

For each corner point $p_i$ in voxel1, for each corner point $p_j$ in voxel2, if the deviation angle of the axis $(p_i, p_j)$ from the vector v is smaller than max_deviation, then the input pair is valid and $(p_i, p_j)$ is added to a list called candidates. Otherwise, if no axis is found, the input pair is not valid and the algorithm stops.

Find in candidates the pair of points with the maximum distance and replace the input pair with it.

The invention claimed is:

1. A computer implemented method for identifying a short axis in an image of a lesion region, the method comprising the steps of:
inputting a set of voxels defining a 3D lesion, and defining a long axis of the lesion and a direction of a plane including the long axis and a short axis;
dividing the long axis into a plurality of ranges, each of the plurality of ranges including a preset range width;
projecting each point of the input set of voxels onto the long axis in a direction perpendicular or substantially perpendicular to a direction of the long axis;

forming clusters of points projected onto a same range and, within each of the formed clusters, defining a most distant point pair;

selecting the most distant pair among the formed clusters as intra_candidate;

for each of the plurality of ranges, finding inter_candidates by evaluating pairs of points with one point belonging to a first range and another point belonging to an adjacent range and selecting the most distant pair of the pairs of points for each of the plurality of ranges;

selecting among the inter_candidates a most distant pair pair_inter satisfying a condition that through its voxels an axis is able to be drawn that is perpendicular or substantially perpendicular to the long axis with an angle of deviation from the direction perpendicular or substantially perpendicular to the long axis that is smaller than a pre-defined value;

assigning the short axis either to the intra_candidate or to the pair_inter if the short axis through its points is longer than an axis assigned to the inter_candidate; and if no pair is found for which inside the voxels of the pair an axis is able to be drawn that is perpendicular or substantially perpendicular to the long axis, increasing the preset range width and repeating the method from the dividing step.

2. The method according to claim 1, wherein if a valid pair is found, voxel centers are replaced by edge points such that a pair is a valid pair if inside the pair an axis is able to be drawn that is perpendicular or substantially perpendicular to the long axis.

3. A non-transitory computer readable medium comprising computer executable program code adapted to carry out the steps of claim 1.

* * * * *